May 3, 1960  R. L. WURGAFT  2,935,175
FRUIT-ORIENTATING MACHINE
Filed Sept. 11, 1957  3 Sheets-Sheet 1
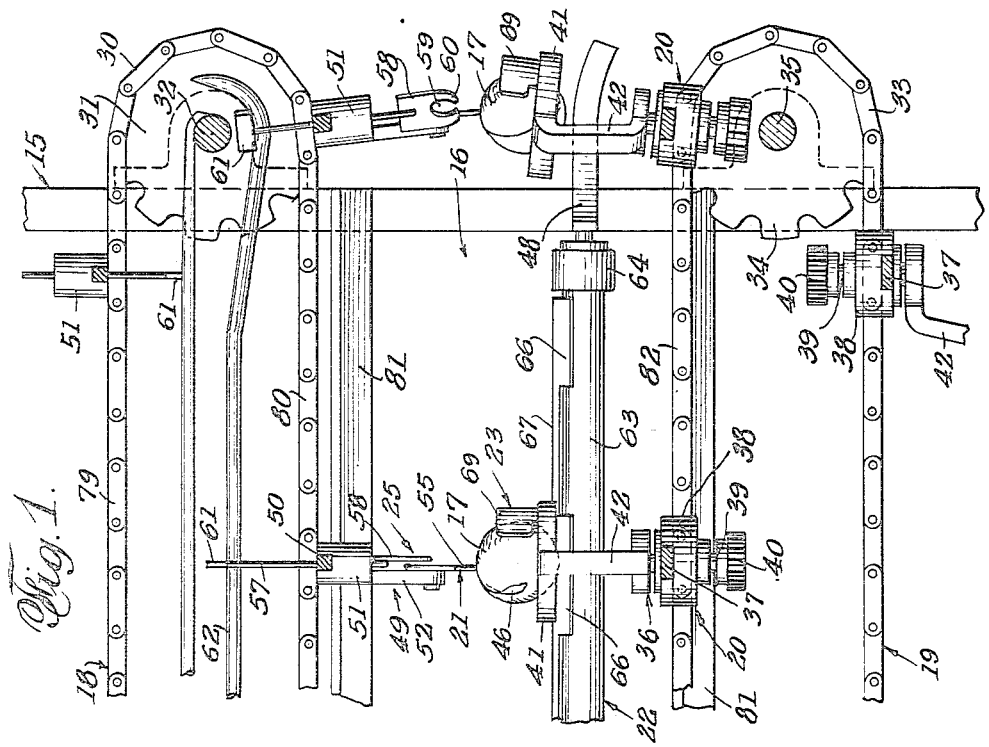
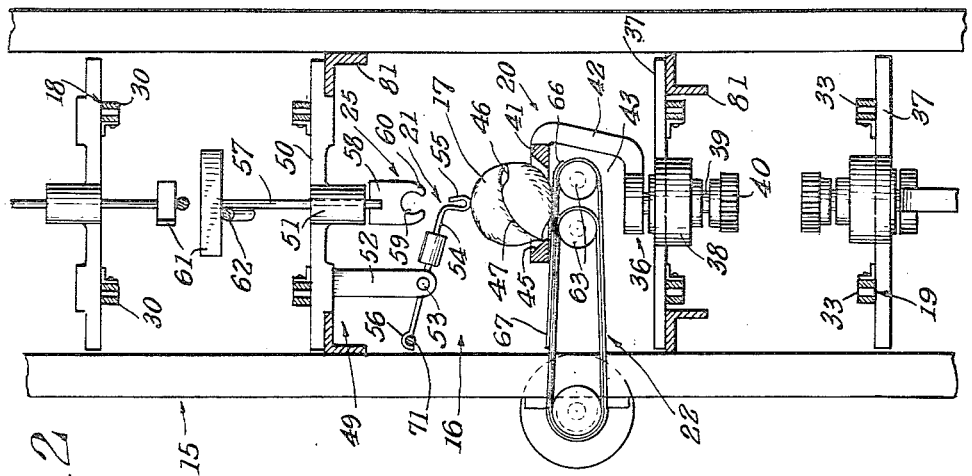
INVENTOR.
ROBERT L. WURGAFT
BY
C. G. Stratton
ATTORNEY

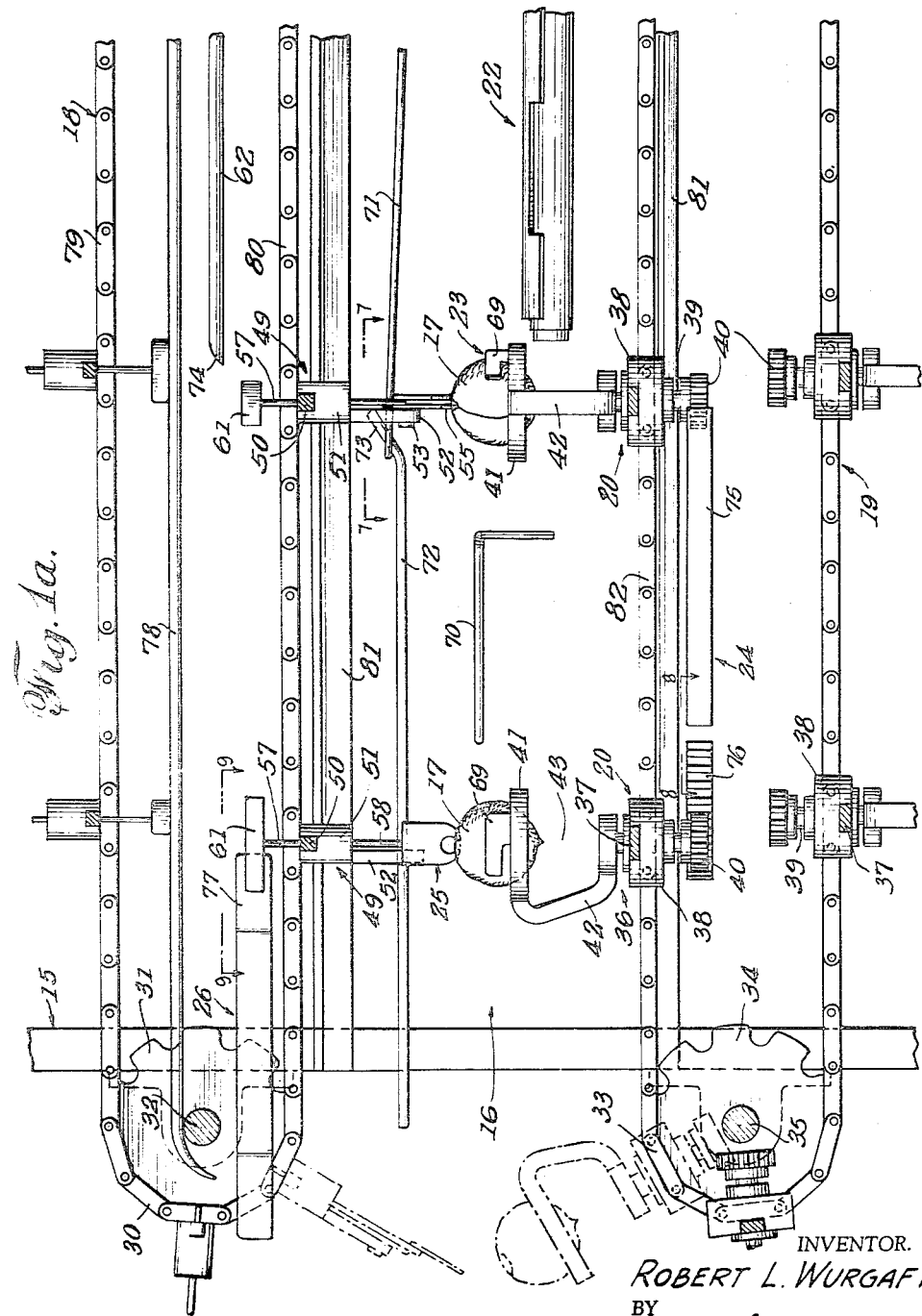

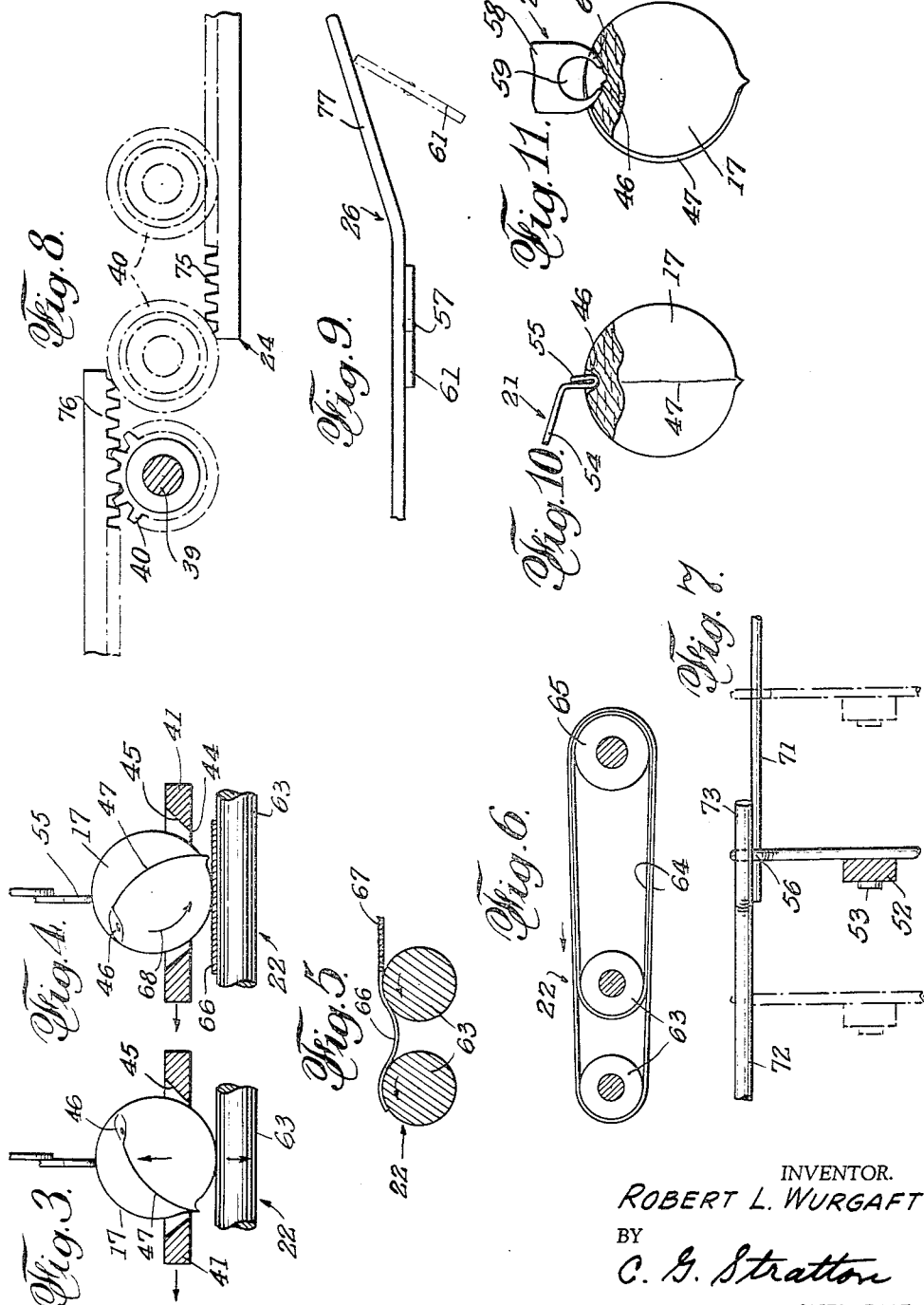

United States Patent Office 2,935,175
Patented May 3, 1960

2,935,175
FRUIT-ORIENTATING MACHINE

Robert L. Wurgaft, Anaheim, Calif.

Application September 11, 1957, Serial No. 683,314

14 Claims. (Cl. 198—33)

This invention relates to a machine for orientating fruits of more or less ovoidal form so that the same are delivered in uniformly similar positions with respect to their major axes with their pits so disposed as to enable uniform division into halves by cutting machines to which delivered. Peaches, nectarines, plums and other such fruits are examples of fruits that require such orientating for most efficient division into halves. In this specification and in the claims, the term "peach" will be used as including all ovoidal shaped fruits that may be slit for canning and comparable purposes.

Since the highest prices are obtained for canned peach halves as compared to peach slices, for instance, the greater proportion of such fruit that is properly halved for canning, the larger the profit or return from a peach crop. Of equal importance is the need for reducing manual handling with assurance of efficient fruit orientation.

An object of the present invention is to provide a fruit-orientating machine that, in an efficient manner, first orientates the stem holes of the fruit during a simple forward progress of the fruit and then, while holding the stem hole thus orientated, revolving the fruit first one way then another, to align the seam of the fruit along the line of travel of the fruit, whether the same is in a trailing or an advancing position.

Another object of the invention is to provide a fruit-orientating machine of the character referred to that first moves the fruit in a rotative manner in a vertical plane, alternately in longitudinal and transverse rotation, to bring the stem holes of the fruit in position, arrests such rotative movement, and then rotates the fruit in a horizontal plane to bring the same into position to orientate or align the seam of the fruit along the line of travel thereof through the machine.

A further object of the invention is to provide a machine of the character referred to that rotates or revolves seam-provided, ovate fruit in all three planes while the same is being progressively moved in a path through said machine.

A still further object of the invention is to provide a fruit-orientating machine in which two of the three rotative movements are used for locating the stem holes in uniform positions and the third is used for aligning the fruit seams while the fruit is being held with the stem holes uniformly disposed.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a longitudinal sectional view of the entry end of a fruit-orientating machine according to the present invention.

Fig. 1a is a similar view of the discharge end of the machine, Figs. 1 and 1a together constituting a longitudinal section of the entire machine.

Fig. 2 is a cross-sectional view as seen from the left end of Fig. 1.

Fig. 3 is an enlarged fragmentary detail and sectional view of means to revolve or rotate a peach in one vertical plane while the same is being moved longitudinally through the machine.

Fig. 4 is a similar view of means to revolve the peach in a vertical plane transverse to the plane of revolution of the means shown in Fig. 3.

Fig. 5 is an enlarged cross-sectional view of the peach-revolving means shown in Figs. 3 and 4.

Fig. 6 is a similar view of the drive means for the peach-revolving means.

Fig. 7 is an enlarged fragmentary detail plan sectional view as taken on the line 7—7 of Fig. 1a.

Figs. 8 and 9 are similarly enlarged plan views as seen on the planes of lines 8—8 and 9—9, respectively, of Fig. 1a.

Fig. 10 shows a peach with a finder in its stem hole.

Fig. 11 shows a peach with a seam or cleft finder in its seam hole or cleft.

It will be understood that the fruit herein discussed is generally rounded and, in any case, is capable of being revolved in all three planes. Also, said fruit has a stem hole or recess that is of elongated form and the longitudinal dimension of said recess continues and follows halfway around the fruit as a seam somewhat raised from the surface of the fruit.

The present machine may be provided with a suitable elongated frame 15 that is preferably horizontal to afford a longitudinal space or path 16 for peaches 17 to be moved from the entry end of the machine at the right to the discharge end at the left.

According to the invention, the present machine comprises, generally, a pair of parallel chain units or the like, the same being designated 18 for the upper and 19 for the lower, said chain units constituting synchronized means for moving fruit 17 along the path 16; means 20, carried by the chain unit 19 with which the fruit is engaged and which so confines the same as to insure freedom of revolution of the fruit in both vertical planes while being moved; means 21 carried by the chain unit 18 and comprising hole- or indent-finder means; means 22 for alternately revolving or rotating fruit engaged in the means 20 in both transverse vertical planes while engaged with the means 21; means 23 to counteract any tendency for the fruit to leave the means 20; means 24 to revolve or rotate the fruit after the same has been orientated to a generally vertical disposition by the means 22; means 25 also carried by the chain unit 18 and comprising a seam-finding means for finding and entering the ovate or elongated peach indents some time during the operation of the means 24, and means 26 at the discharge end of the machine for so aligning the means 25 that fruits engaged therewith are aligned with their seams uniformly aligned either in trailing or advancing position relative to the path of travel of the fruit.

The chain unit 18 is shown as two parallel endless chains 30 that are trained over sprocket wheels 31 at the opposite ends of the machine, the latter being carried on shafts 32, and one of said shafts being driven at a continuous and uniform rate. Said unit 18 is arranged so as to be above the fruit path 16 with the chains 30 transversely spaced within the machine frame 15.

In a similar manner and below the space or path 16, the chain unit 19 comprises two parallel endless chains 33 trained over sprocket wheels 34 on cross shafts 35. The chain unit 19 is driven at the same rate of speed as the unit 18 and in a direction so that the upper run of the former and the lower run of the latter move synchronously in the same direction. While the chain drive is not shown, it is evident that the same may be readily provided on either pair of shafts 32 and 35.

The means 20 comprises a series of similar devices 36 preferably uniformly arranged along chain unit 19. Each said device 36 comprises a transverse frame 37 that connects the chains 33 and is provided with a bearing 38 through which extends a shaft 39 that is transversely directed to the frame 37 and extends vertically when the device 36 is moving with the upper run of the chain unit 19. Said shaft carries a pinion gear 40 on the end thereof away from the lower run of chain unit 18 and the other end of the shaft carries a bottom-open cup 41 that is provided with a radial connecting arm 42 whereby said cup is upwardly spaced at 43 from the chain unit 19 and from a base 34.

As can be seen from Figs. 2, 3 and 4, said cups 41 are each formed with a central opening 44 that is defined by a conical wall 45. A piece of fruit is adapted to be supported by said wall and to protrude partly through the opening 44. Upon lifting of said fruit from engagement with the wall 45, the same may be freely rotated as it is moved along by the cup. It will be clear that the space 43 is beneath the cup and the arm 42 is disposed laterally of said space. The device thus provided is freely rotational on the axis of the shaft 39.

It will be understood that peaches or other fruit are fed to the cups 41 by any suitable chute as the same achieve or near the position at the right end of Fig. 1. It will also be understood that the automatic feed of the fruit results in the same assuming different positions in the cups with respect to the location of the stem hole or cleft 46 and the seam 47. At said end of the machine is provided a cup-turning means 48 that is encountered by the arm 42, the same, by imparting rotative movement to the cup by engaging the arm, bringing the latter to the same position for each device 36 of the machine, whereby the means 22 may be cleared by the devices 36 as the latter move toward the discharge end of the machine. Moreover, as may be seen from Fig. 2, the portions of the devices 36 that are rotative on the axes of shafts 39 are maintained oriented by the means 22 at the position to which rotated by the means 48. Thus, the cups 41 move past the means 22 with little or no rotation.

The means 21 comprises a series of similar devices 49 preferably uniformly arranged along chain unit 18 and at the same spacing as the devices 36. The driving connection between the chain units 18 and 19 moves the devices 36 and 49 together in pairs substantially in the manner shown in the drawings.

Each device 49 comprises a transverse frame 50 that connects the chains 30 and is provided with a slide bearing 51, centered with respect to the chains 30 and aligned with the axis of cup 41 with which paired, and with a bracket 52 to one side of the frame 40. The latter mounts the means 21 on a pivot 53, which carries a weighted lever 54 (Fig. 2) that has a stem hole finder end 55 disposed and formed to center over the stem indent of a peach in such paired cup. Opposite the end 55, said lever is provided with an extension 56. The lever 54 is so weighted or biased that the end 55 seeks a low position unless the extension 56 is depressed. The bearing 51 mounts the means 25. The same constitutes a slide guide for a rod or the like 57. The end of the rod that is directed toward the cup 41 is provided with a seam finder 58. The foregoing constitutes the means 21. Said finder 58 is shown as a flat plate formed to have a recess 59 defined by transversely spaced fingers 60. When the latter enters a stem hole or cleft 46, there is effected a connection between a peach and the means 25 that causes one to rotationally move with the other. The opposite end of the rod 57 is provided with a transverse plate 61 that has a particular relationship to the plane of the seam finder. In this instance, the said plate and finder are aligned in the same plane.

The hole finder 55 of the means 21 normally rests upon a peach 17 while the paired devices move together past the means 22. However, the seam finder 25 is inactive at this time and is kept so by a rail 62 that engages the plate 61 of the devices 49 to hold the fingers 60 elevated out of contact with the peach. Figs. 1 and 2 show this condition.

The means 22 is shown as comprising a pair of parallel rollers 63 that are arranged longitudinally and so centered as to have the peaches in the cup 41 rest thereon as the same are moved toward the discharge end of the machine. Said rollers are rotated in the same direction to cause a peach resting thereon to tend to rotate any point on the fruit in a vertical plane transverse to the line or path of movement of said peach along said rollers 63. The arrow within the fruit 17 in Fig. 3 shows such tendency of movement, said arrow being in a plane that is transverse to the arrow at the left of said figure, the latter showing the line of path or movement of the fruit. Said rollers 63 may be driven by belts 64 from a single drive pulley 65 and at any desired rate of speed. It will be clear that such rotation of the peach is modified by the fact that the peach is moved bodily and so partly rolls around so that any point thereon moves in a vertical plane that is transverse to the planes in which the rollers 63 tend to rotate the points on the fruit.

The means 22 further includes a series of stationary plates 66 that overstand the rollers 63 and may be formed as longitudinally spaced sections of the same plate 67. When a peach is moved over one of said plate sections 66, the points thereon cease to rotate or revolve in the first-mentioned vertical planes and rotate or revolve only in the second-mentioned planes, as indicated by the arrow 68 of Fig. 4. Since the peach is turned first one way then the other, and such turnings are effected a plural number of times, there is a pronounced likelihood that some time during such turnings, the indent-finder end 55 will find and drop into the peach cleft 46. Whenever this occurs, the peach ceases to revolve because said finder end 55 prevents the same. By arranging the drive of rollers 63 to be in a direction to more firmly seat end 55, such revolution is surely prevented and a peach will complete its traverse of the means 22 with its stem hole or cleft upwardly directed.

It will be realized that the peaches are raised by the means 22 out of full frictional engagement with the cups in which initially placed, generally as shown in Figs. 3 and 4, are are pushed along the means 22 by the trailing portion of the cup opening 44. Thus, the peaches are free to be turned by said means 22 as they are pushed, in the manner above indicated, until the stem hole-finder finds and enters the stem hole.

During such turnings of the peach and particularly because the cup 41 pushes the peach along, the same may tend to climb out of its seat 45. To prevent this, the means 23 is provided, the same comprising a wall 69 on the cup and in position to intercept a peach having such tendency to move out of the cup. Said means 23 may also include a member 70 alongside of which the peach is moved after it leaves the means 22, said member preventing lateral displacement of the peach while the cleft or hole 46 thereof is freed from the finder end 55. In order to insure against the peach being moved from the orientated position with the stem hole up, the extension 56 of lever 54 is pressed upwardly by a rail 71 (Fig. 7), thereby causing said end 55 to be pressed firmly into the stem hole. The pressure is preferably resilient, the rail 74 being made of a resilient member.

After the peach leaves the means 22, the resilient rail 71, through the medium of the lever 54, presses the peach into firm frictional engagement in the seat or opening 44 of the cup in which disposed. In such condition, the peach and cup may rotate together but the former does not become again shifted in its seat after the lever end 55 is removed from the stem hole.

Said hole-finder end 55 is lifted from the peach, after the latter leaves the means 22, by a rail 72 which depresses the arm extension 56 after said extension moves off the end of the resilient rail 71. It will be realized from Fig. 1a that rail 71 is depressed to the level of rail 72 while such transition from one rail to the other occurs, the bend 73 of rail 72 guiding extension 56 beneath the latter rail as the peach-carrying means 20 moves toward the exit end of the machine.

The plate 61 of the seam-finding means 25 of that device 49 of which the hole finder end 55 is thus being lifted leaves the end 74 of the rail 62, thus allowing the seam-finder 58 to fall gravitationally onto the peach and, most likely, with the fingers 60 thereof in straddling relation across the stem hole. If the peach hole has a stem, the same is accommodated in the recess 59 of the seam-finder. If found necessary, the latter finder may be weighted to insure a firm, yet light, engagement with the peach.

As the peach progresses toward the exit end of the machine, the means 24 comes into play to turn the cup 41 and the peach therein, first one way and then the other, as the pinion gear 40 achieves mesh with the successive racks 75 and 76 which are on opposite sides of the path of movement of the gear, as can be seen in Fig. 8. While only two such racks are shown, it will be clear that more can be provided if repeated reversals of rotational direction of the peach are desired in order to cause the fingers 60 of the seam-finder to fall into the stem hole, as in Fig. 11. Since said hole is ovate in form, the finder and peach become so connected that they will turn together.

It will be realized that each change of rotation of the cup by the racks produces a slight jarring action that induces relative rotation of the finder 58 and the peach. One or two such changes should result in the mentioned coupling of finder and peach.

Continued progress of the peach toward its exit from the machine will bring the plate 61 into engagement with the means 26. As can be seen from Fig. 9, regardless at what angle the plate 61 is in when the same encounters the lead-in sloping end 77 of said means 26, said plate 51 is turned to become aligned with the path of movement of the peach. The means 26 is extended to hold this alignment as the peach reaches the discharge point.

In this condition, the peach has its seam 47 either in advanced or trailing position. Thus, it is a simple matter to pick up the peach in this orientated position and present it to a cutter which halves the same directly through the seam. Since all peaches handled by the machine will, most likely, be so turned in the three planes above-described as to be first orientated to have the stem hole up and then turned to align the seam as described, all of them will be discharged from the machine in orientated position to be cut in the same way to produce cannable peach halves.

A rail 78 may be provided for keeping the devices 49 on the return run 79 of the chain unit 18 clear of those being moved with the operating lower run 80. As shown at the right end of the machine, said rail may so terminate as to permit the devices to resume their normal operative condition with the plates engaged by rail 62 to hold the seam-finders raised. Suitable frame members, such as the angle members 81, may be used to hold the lower run 80 of the upper chain conveyor and the upper run 82 of the lower chain conveyor in proper operative spaced relation.

While the foregoing has illustrated and described what I now contemplate to be the best mode of carrying out my invention, the construction is, of course, subject to modification without departing from the spirit and scope of my invention. Therefore, I do not desire to restrict the invention to the particular form of construction illustrated and described, but to cover all modifications that may fall within the scope of the appended claims.

Having thus described my invention, what I claim and desire to secure by Letters Patent is:

1. A machine for orientating fruit that has an ovate stem hole and a seam along which said fruit is adapted to be cut for halving thereof preparatory to canning, said machine comprising means to move the fruit along a path toward discharge from the machine, means on which the fruit rests while being moved in said path to intermittently turn the fruit so that any point thereon moves in a vertical plane parallel to the mentioned path of movement and, alternately, to turn the fruit so that any point thereon tends to move in a vertical plane transverse to the path of movement of the fruit and to the first-mentioned plane, a stem hole finder biased to drop into said stem hole when said hole moves, during such turnings of the fruit, to a substantially vertical position, the mentioned path extending beyond the fruit-turning means, means to revolve the fruit so that any point thereon moves in a horizontal plane while the stem hole of said fruit is thus located by the finder, a seam locator biased to enter said ovate seam while the fruit is being revolved to effect a non-rotative connection between the locator and the fruit, and means effective during continued movement of the fruit along said path to align the locator so as to orientate the fruit with the seam thereof along said path.

2. A machine according to claim 1 in which the fruit-turning means includes means to drive one fruit-turning means.

3. A machine according to claim 1 in which the fruit-turning means includes means to drive one fruit-turning means and stationary means cooperating with said driven means and over which the fruit is moved along its path.

4. A machine according to claim 3 in which the fruit is disposed in a cup and said cup comprising part of the fruit-moving means, said cup having an opening through which the fruit extends into engagement with the turning means.

5. A machine according to claim 3 in which the fruit is disposed in a cup and said cup comprising part of the fruit-moving means, said cup having an opening through which the fruit extends into engagement with the turning means, the cup being rotatively mounted and having means so engaged with the fruit-turning means as to retain the cup non-rotative while the fruit is being turned.

6. A machine according to claim 4 in which the fruit-turning means raises the fruit out of full frictional engagement with the cup and retaining engagement with the cup to be moved thereby along the mentioned path while the fruit is being turned, and the fruit, after being held from turning by the hole finder, falling gravitationally into resting frictional engagement with the cup to turn therewith.

7. A machine for orientating fruit that has an ovate stem hole and a seam along which said fruit is adapted to be cut for halving thereof preparatory to canning, said machine comprising two parallel, endless conveyors, rotational cups carried by one conveyor and receptive of fruit, said cups having open bottoms, devices carried by the other conveyor for first finding the stem hole in said fruit and then orientating the same to dispose the seam of the fruit along the path of movement of the fruit, said cups and devices being arranged in cooperating pairs and the conveyors being moved together to retain cooperative engagement of said pairs, and means to turn the fruit in the cup so that any point on the fruit turns, first, in one vertical plane and tends to turn in a transverse vertical plane and, then, in a horizontal plane to first bring the stem hole of the fruit to a position to be engaged by the hole-finding means and then bring the fruit into an aligned engagement with the orientating means.

8. A machine according to claim 7 in which means is provided to engage the mentioned devices to turn the same to a position that brings the seam of a fruit in the cup into alignment with the path of movement of the fruit.

9. In a machine of the character described, fruit-turning means comprising roller means upon which fruit is adapted to be rested while being moved along a longitudinal path, means to rotate the roller means to impart corresponding turning rotation to the fruit resting thereon, and a plurality of stationary plates superimposed over the roller means and across which the fruit is moved during such movement along the path, said roller means comprising at least two rollers on parallel axes that impart turning movement of the fruit so that any point on said fruit tends to turn in a plane that is both transverse to the plane in which the rollers are disposed and normal to the parallel axes of the rollers.

10. In a machine according to claim 9, a biased finder engaged with the topmost part of the fruit while the latter is being turned and adapted to fall into the stem hole of the fruit upon mutual alignment of said hole and finder.

11. In a machine according to claim 9, a biased finder engaged with the topmost part of the fruit while the latter is being turned and adapted to fall into the stem hole of the fruit upon mutual alignment of said hole and finder, the fruit-turning means revolving the fruit in a direction to retain the finder in the stem hole.

12. In a machine according to claim 11, a cup in which the fruit is engaged and which moves the fruit along its path, and said cup being so located with respect to the fruit-turning means as to cause the latter to raise the fruit out of resting engagement with the cup while retaining fruit-moving engagement with the cup during turning movement of the fruit.

13. In a machine according to claim 11, a cup in which the fruit is engaged, and said cup being so located with respect to the fruit-turning means as to cause the latter to raise the fruit out of resting engagement with the cup during turning movement of the fruit, said cup being revolubly mounted and the fruit, after moving out of engagement with the turning means, falling into resting position in the cup whereby cup and fruit are revoluble together.

14. In a machine according to claim 11, the finder being carried on a pivot offset from the path of movement of the fruit, and the rollers revolving the fruit in a direction to move the stem hole thereof toward the finder.

References Cited in the file of this patent

UNITED STATES PATENTS 2,742,137     Carroll _____ Apr. 17, 1956

FOREIGN PATENTS 161,038     Australia _____ Apr. 23, 1953